(12) United States Patent
Davidson et al.

(10) Patent No.: US 12,177,255 B2
(45) Date of Patent: *Dec. 24, 2024

(54) EXTENSION FRAMEWORK FOR DATA ANALYTICS

(71) Applicant: Google LLC, Mountain View, CA (US)

(72) Inventors: Jamie Davidson, Mountain View, CA (US); Wil Gieseler, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/166,221

(22) Filed: Feb. 8, 2023

(65) Prior Publication Data

US 2023/0188572 A1     Jun. 15, 2023

Related U.S. Application Data

(63) Continuation of application No. 17/066,470, filed on Oct. 8, 2020, now Pat. No. 11,582,262.

(51) Int. Cl.
*H04L 9/40*       (2022.01)
*G06F 9/54*       (2006.01)

(52) U.S. Cl.
CPC ................ *H04L 63/20* (2013.01); *G06F 9/54* (2013.01)

(58) Field of Classification Search
CPC .................................... H04L 63/20; G06F 9/54
See application file for complete search history.

(56) References Cited

U.S. PATENT DOCUMENTS

| | | | | |
|---|---|---|---|---|
| 7,908,599 | B2* | 3/2011 | Martin | G06F 9/468 717/166 |
| 7,941,522 | B2* | 5/2011 | Hughes, Jr. | H04N 21/4431 709/224 |
| 9,584,494 | B2* | 2/2017 | Lim | H04L 63/205 |
| 9,648,040 | B1* | 5/2017 | Morkel | G06F 21/629 |
| 9,826,045 | B2 | 11/2017 | Straub et al. | |
| 10,142,373 | B2* | 11/2018 | Arkin | H04L 63/1408 |
| 10,165,010 | B2* | 12/2018 | Hamilton, II | H04L 63/20 |
| 10,282,216 | B2 | 5/2019 | Poon et al. | |
| 10,681,012 | B2* | 6/2020 | Subbarayan | H04L 63/0876 |
| 10,908,970 | B1* | 2/2021 | Arivazhagan | G06F 9/54 |
| 10,951,728 | B2* | 3/2021 | Lepp | H04L 67/566 |

(Continued)

*Primary Examiner* — Viral S Lakhia

(74) *Attorney, Agent, or Firm* — Honigman LLP; Brett A. Krueger

(57) ABSTRACT

Extending access to a data model includes loading into a programmatically isolated process address space of a computer, an instance of an extension framework computer program and executing in the framework, computer program logic configured to establish a communicative channel between the isolated process address space and a data analytics computer data processing system executing in a separate process address space. Thereafter, within the framework a directive may be received to access a data model managed in the data analytics computer data processing system. In response, a function may be selected in respect to an API to the data analytics computer data processing system corresponding to the received directive. Finally, the selected API function may be invoked over the communicative channel and a result derived from the data model may be received in the framework from over the communicative channel in response to the selected API function.

14 Claims, 2 Drawing Sheets

(56) References Cited

U.S. PATENT DOCUMENTS

| | | | |
|---|---|---|---|
| 10,990,689 B1* | 4/2021 | Reiner | G06F 21/604 |
| 11,012,475 B2* | 5/2021 | Patnala | H04L 41/40 |
| 11,138,330 B2* | 10/2021 | Struttmann | G06F 21/6218 |
| 11,343,247 B1 | 5/2022 | Ozarkar et al. | |
| 11,450,069 B2 | 9/2022 | Chauhan | |
| 11,507,627 B2* | 11/2022 | Teichmann | G06F 16/252 |
| 11,528,253 B2* | 12/2022 | Burakovsky | H04L 61/5007 |
| 11,546,367 B2* | 1/2023 | Lukiyan | H04L 63/1416 |
| 11,582,262 B2* | 2/2023 | Davidson | G06F 21/6218 |
| 2008/0022362 A1* | 1/2008 | Hinton | H04L 63/101 |
| | | | 707/E17.112 |
| 2014/0372427 A1 | 12/2014 | Lehmann et al. | |
| 2015/0100550 A1 | 4/2015 | Desai et al. | |
| 2016/0110236 A1 | 4/2016 | Mcclain et al. | |
| 2016/0321120 A1 | 11/2016 | Ghanakota et al. | |
| 2017/0017483 A1 | 1/2017 | Poon et al. | |
| 2018/0115470 A1* | 4/2018 | Huang | H04L 41/0893 |
| 2019/0052621 A1* | 2/2019 | Sahraei | H04L 63/10 |
| 2019/0089743 A1* | 3/2019 | Ramaswamy | G06F 21/604 |
| 2020/0336508 A1* | 10/2020 | Srivastava | H04L 63/20 |
| 2020/0374324 A1 | 11/2020 | Le Strat et al. | |
| 2021/0099490 A1 | 4/2021 | Crabtree et al. | |
| 2021/0218652 A1* | 7/2021 | Raut | H04L 45/64 |
| 2022/0107802 A1 | 4/2022 | Rao et al. | |

* cited by examiner

EXTENSION FRAMEWORK FOR DATA ANALYTICS

CROSS REFERENCE TO RELATED APPLICATIONS

This U.S. patent application is a continuation of, and claims priority under 35 U.S.C. § 120 from, U.S. patent application Ser. No. 17/066,470, filed on Oct. 8, 2020. The disclosure of this prior application is considered part of the disclosure of this application and is hereby incorporated by reference in its entirety.

TECHNICAL FIELD

The present disclosure relates to the field of data analytics and more particularly to the end user extension of the functionality of a data analytics application.

BACKGROUND

Data analytics refers to the analysis of raw data in order to draw conclusions regarding the information reflected by the raw data. This information can then be used to optimize different processes in order to increase the overall efficiency of a business or system. Data analytics generally require the presence of a data store such as a database, against which different queries may be lodged in order to provide derived information which characterizes the data in the data store in a meaningful way. Oftentimes, the derived information may be presented in a user interface in a particular format such as a tabular form, or more abstractly in the form of a graphical visualization such as a chart or graph. Business intelligence (BI) is natural consequence of data analytics, in which different real-world questions regarding the data collected for a business are answered utilizing data analytics so as to provide "actionable insights" into the nature, operation and performance of a business.

BI and underlying data analytics as they pertain to a single data store, can be a relatively simplistic proposition. First connect to the data store according to a known methodology, such as through the use of a pre-existing database connector, and then format and launch queries against the data store according to a known schema for the data in the data store. Then, present the result of the queries in a meaningful way so as to provide the desired BI. Matters become more complex, however, when multiple different heterogeneous data stores form the data storage basis for the underlying data analytics. In that instance, multiple different manners of connecting to an underlying data source will be required along with a satisfactory understanding of the schema for each data source. To account for this complexity, in contemporary BI it has been proven effective to first generate a data model for the underlying data in each of the heterogeneous data stores and then conduct data analytics upon the data model, which then acts as a layer of abstraction over the underlying data sources.

Generally, a BI application and underlying data analytics application produces a workable starting point for the end user. However, it had become well-understood that as the end user becomes skilled in the use of BI, customizations become required as to the structure and presentation of the data model and the queries conducted against the data model so as to produce the actionable intelligence sought from the BI application. In a multi-user environment, though, permitting direct access by the end user to the data model opens the data model for corruption to the detriment of other end users. As well, to the extent that any extension to the logic of a BI application performs errantly during execution, the logic may disrupt the nominal function of the BI application for other end users. Consequently, so as to avoid the corruption of the data model and the disruption of the operation of the BI application, generally the end user is limited by the structure of the BI application to the mere aggregation of some basic operations provided by the BI application for assembly into what amounts to a macro, as opposed to a fully executing, programmatic module of limitless logic.

SUMMARY

Examples of the present disclosure address deficiencies of the art in respect to the extension of functionality of a data analytics application, and provide a novel and non-obvious method, system and computer program product for extending access to a data model in a data analytics computer data processing system. One aspect of the disclosure provides a method for extending access to a data model in a data analytics computer data processing system. The method includes loading, by data processing hardware, an instance of an extension framework computer program into a programmatically isolated process address space of a computer. The method further includes executing in the framework, by the data processing hardware, computer program logic configured to establish a communicative channel between the isolated process address space and a data analytics computer data processing system executing in a separate process address space. The method further include receiving in the framework, a directive to access a data model managed in the data analytics computer data processing system. The method also includes selecting an application programming interface (API) function of an API to the data analytics computer data processing system corresponding to the received directive. The method further includes invoking over the communicative channel, the selected API function and receiving in the framework from over the communicative channel in response to the selected API function, a result derived from the data model.

This aspect may include one or more of the following optional features. In some implementations, the method includes filtering the API to include only a subset of functions accessible in the framework according to a security policy. In some examples, the method includes filtering the API to include only a subset of functions accessible in the framework according to a role of a requestor of the directive. In some configurations, the access to the model is an aggregation function. In some implementations, the framework receives the directive from over a computer communications network from a remote client.

Another aspect of the disclosure provides data analytics data processing system configured for extending access to a data model. The system includes a host computing platform including one or more computers, each with memory and at least one processor. The system also includes a programmatically isolated process address space defined in the memory of the host computing platform. The system further includes an instance of an extension framework computer program executing in the programmatically isolated process address space. Computer program logic executes as part of the framework and is configured to establish a communicative channel between the isolated process address space and the data analytics computer data processing system executing in a separate process address space defined in the memory of the host computing platform, the logic including computer program instructions enabled during execution in the memory of the host computing platform to perform operations including receiving in the framework, a directive to access a data model managed in the data analytics computer data processing system. The operations further include selecting an application programming interface (API) function of an API to the data analytics computer data processing system corresponding to the received directive. The operations also include invoking over the communicative channel, the selected API function and receiving in the framework from over the communicative channel in response to the selected API function, a result derived from the data model.

This aspect may include one or more of the following optional features. In some examples, the program instructions are further enabled to filter the API to include only a subset of functions accessible in the framework according to a security policy. In some examples, the program instructions are further enabled to filter the API to include only a subset of functions accessible in the framework according to a role of a requestor of the directive. In some configurations, the access to the model is an aggregation function. In some examples, the framework receives the directive from over a computer communications network from a remote client.

Another aspect of the disclosure provides a computer program product for extending access to a data model in a data analytics computer data processing system. The computer program product includes a computer readable storage medium having program instructions embodied therewith. The program instructions are executable by a device to cause the device to perform a method including loading an instance of an extension framework computer program into a programmatically isolated process address space of a computer. The method also includes executing in the framework, computer program logic configured to establish a communicative channel between the isolated process address space and a data analytics computer data processing system executing in a separate process address space. The method further includes receiving in the framework, a directive to access a data model managed in the data analytics computer data processing system. The method also includes selecting an application programming interface (API) function of an API to the data analytics computer data processing system corresponding to the received directive. The method further includes invoking over the communicative channel, the selected API function and receiving in the framework from over the communicative channel in response to the selected API function, a result derived from the data model.

This aspect may include one or more of the following optional features. In some examples, the method further includes filtering the API to include only a subset of functions accessible in the framework according to a security policy. Optionally, the method further includes filtering the API to include only a subset of functions accessible in the framework according to a role of a requestor of the directive. In some implementations, the access to the model is an aggregation function. In some configurations, the framework receives the directive from over a computer communications network from a remote client.

The details of one or more implementations of the disclosure are set forth in the accompanying drawings and the description below. Other aspects, features, and advantages will be apparent from the description and drawings, and from the claims.

DESCRIPTION OF DRAWINGS

The accompanying drawings, which are incorporated in and constitute part of this specification, illustrate embodiments of the disclosure and together with the description, serve to explain the principles of the disclosure. The embodiments illustrated herein are presently preferred, it being understood, however, that the disclosure is not limited to the precise arrangements and instrumentalities shown, wherein.

Like reference symbols in the various drawings indicate like elements.

DETAILED DESCRIPTION

Examples of the disclosure provide for extending access to a data model in a data analytics computer data processing system. In accordance with an example of the disclosure, an extension framework may be loaded into an isolated process address space of a computer, for instance within a virtual machine (VM) or a pod within a containerized environment. The extension framework provides computer program instructions that extend the functionality of a data analytics computer data processing system executing in a separate process address space, by applying directives to data in a data model of the data analytics computer data processing system as a proxy on behalf of program code of the extension framework.

As such, the extension framework includes program instructions adapted to establish a communicative channel between the isolated process address space and the data analytics computer data processing system. The program instructions are additionally adapted to receive in the framework, a directive to access the data model, to select an API function of an API to the data analytics computer data processing system corresponding to the received directive and to invoke over the communicative channel, the selected API function so as to receive in the framework from over the communicative channel in response to the selected API function, a result derived from the data model. The result may then be processed by the program instructions so as to extend the functionality of the data analytics computer data processing system. In this way, the data analytics computer data processing system can be extended without limitation while protecting the integrity of the data model and the operation of the data analytics computer data processing system.

Figure 1:
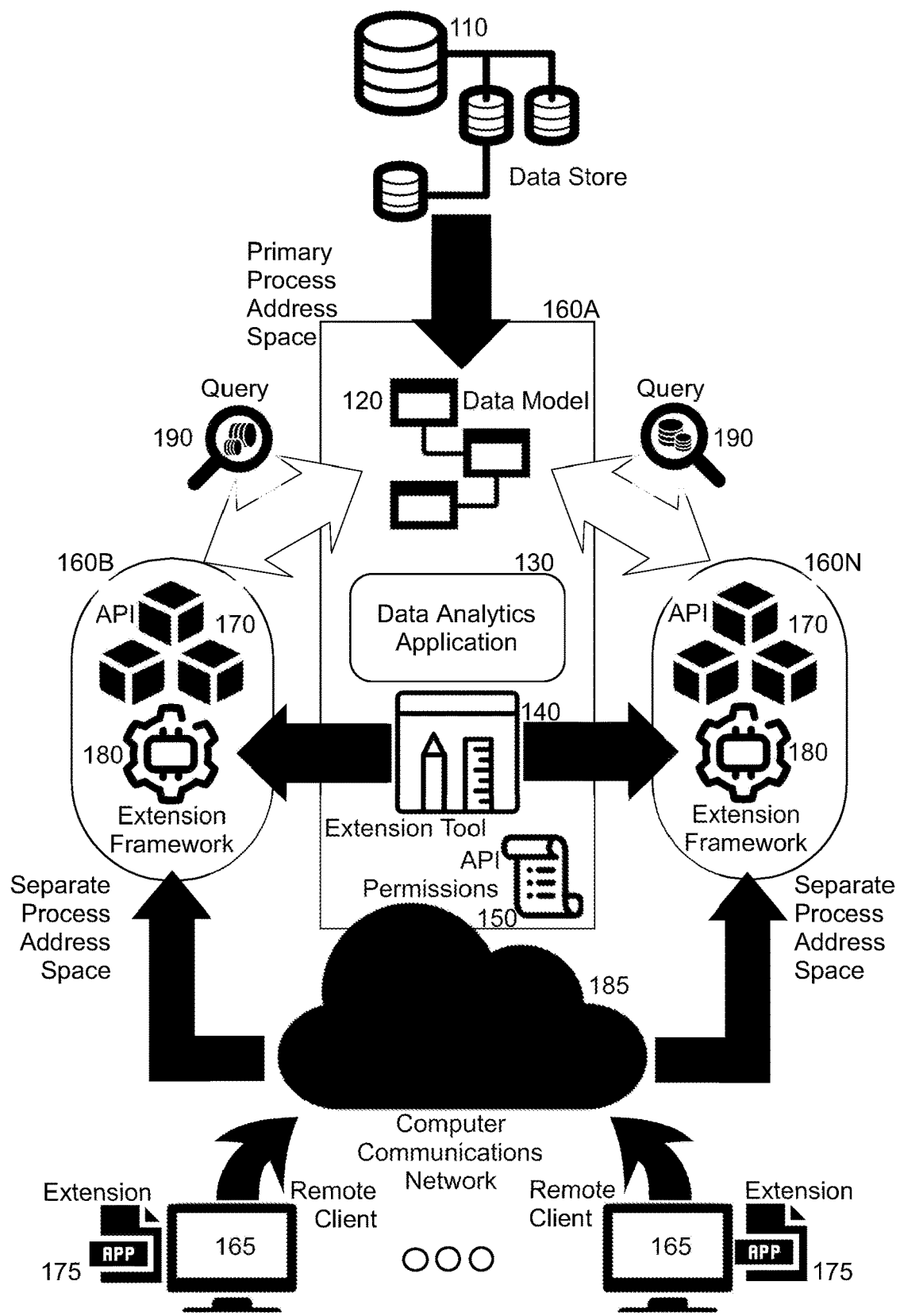
FIG. 1 is pictorial illustration of a process for extending access to a data model in a data analytics computer data processing system.

In further illustration, FIG. 1 pictorially shows a process for extending access to a data model in a data analytics computer data processing system. As shown in FIG. 1, a data analytics application 130 executes in connection with a primary process address space 160A of a computing system. The data analytics application 130 is adapted to conduct queries against a data model 120 of an underlying data store 110 which includes an architecture of one or more databases each ranging from a relational database to an object database to a flat file database and so forth. An extension tool 140 is included in connection with the data analytics application 130. The extension tool 140 is an end user accessible portion of the data analytics application 130 enabled to define a separate process address space 160B, 160N from the process address space 160A of the data analytics application 130 and to deploy into the separate process address space 160B, 160N, an extension framework 180.

The extension framework 180 includes computer program instructions supporting an API 170 for the data model 120. The API 170 includes programmatic functions for issuing queries 190 to the data model 120 including read operations and aggregation functions. The computer program instructions of the extension framework 180 additionally are enabled to receive a connection with an extension 175 to the data analytics application 130 so as to receive directives from the extension 175 to access the data model 120. The directives can be simple data access directives such as selecting a set of records according to a key, or more complex aggregate functions returning a value based upon a specified set of records. To that end, the extension 175 may include computer program instructions without limitation enabled to extend the functionality of the data analytics application 130, albeit within a different process address space 160B, 160N than the process address space 160A of the data analytics application 130, and with moderated access to the data model 120 in the process address space 160A of the data analytics application 130 by way of the API 170.

Notably, the extension 175 may execute in the separate process address space 160B, 160N along with the extension framework 180, or the extension 175 may execute remotely from over a computer communications network 185 in a remote client 165. However, access to particular directives of the API 170 can be limited based upon a set of API permissions 150 defined by way of the extension tool 140. In particular, the API permissions 150 can limit access to particular directives of the API 170 according to the role of the end user or a security policy such as a time when the directives may be processed, a location from which the directives may be received, or a number of directives able to be processed by the end user within a period of time, to name just a few examples. In this way, the functionality of the data analytics application 130 can be extended in the separate process address space 160B, 160N without functional limitation while not jeopardizing the operation of the data analytics application 130 in the process address space 160A, and while protecting the integrity of the data model 120 through the use of the API 170 managed by the extension framework 180 while controlling access to the data model 120 according to a defined rules of the API permissions 150.

Figure 2:
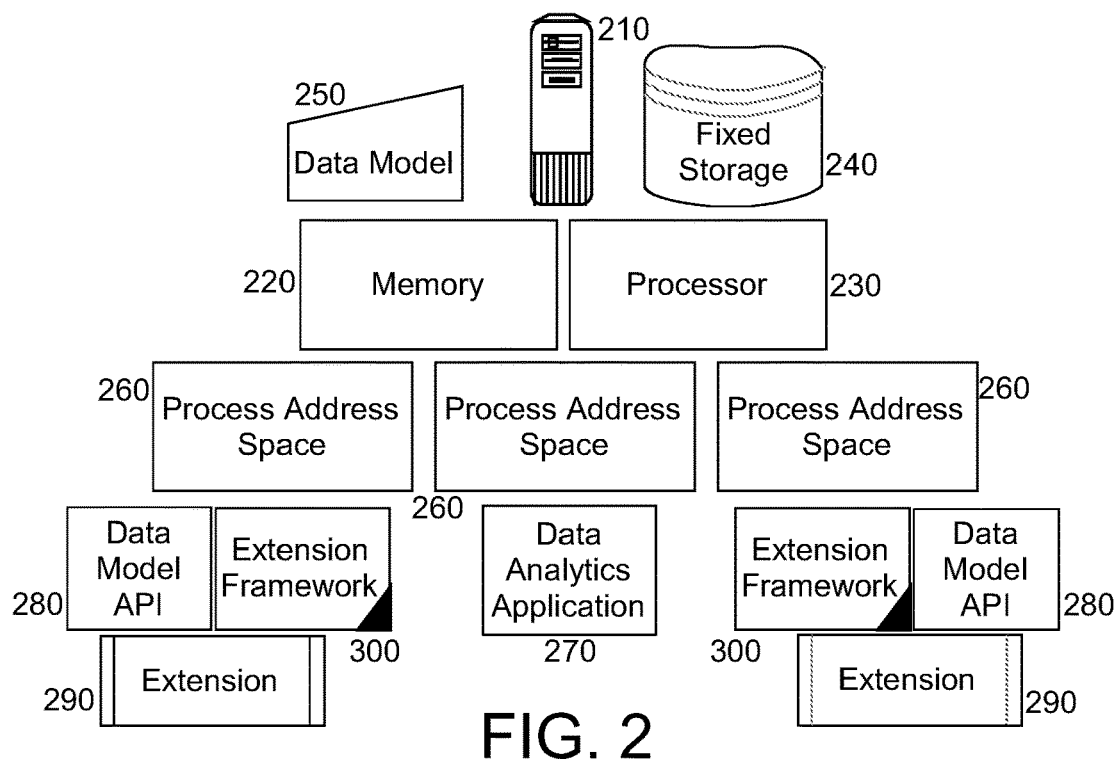
FIG. 2 is a schematic illustration of a data analytics computer data processing system adapted for extending access to a data model; and, FIG. 3 is a flow chart illustration a process for extending access to a data model in a data analytics computer data processing system.

The process described in connection with FIG. 1 may be implemented within a data processing system. In further illustration, FIG. 2 schematically shows a data analytics computer data processing system adapted for extending access to a data model. The system includes a host computing platform 210 that includes memory 220 and at least one processor 230, and fixed storage 240 including one or more databases stored in one or more storage devices. Multiple different and separate process address spaces 260 are defined in the memory 220 of the host computing platform 210. A data analytics application 270 executes in one of the process address spaces 260 and manages a data model 250 defined in the memory 220 for one or more of the databases in the fixed storage 240.

Notably, one or more extension frameworks 300 each are deployed into a correspondingly different one of the process address spaces 260 separate from the process address space 260 of the data analytics application 270. The extension framework 300 incorporates an API 280 defining an interface to the data model 250 accessible through the programmatic functionality of the extension framework 300. Consequently, an extension 290 to the data analytics application 270 may access the API 280 through the extension framework 300 within a corresponding one of the process address spaces 260 so as to access, indirectly, the data model 250 in extending the functionality of the data analytics application 270. More particularly, the program logic of the extension 290, defined by an end user and executing in the corresponding process address space 260 separate from that of the data analytics application 270, is enabled to issue directives to the extension framework 300 according to the API 280 which, if permitted by permissions associated with the extension framework 300, are transformed into queries against the data model with results from the queries being returned by the extension framework 300 to the extension 290 for use by the extension 290 in extending the functionality of the data analytics application 270.

Figure 3:
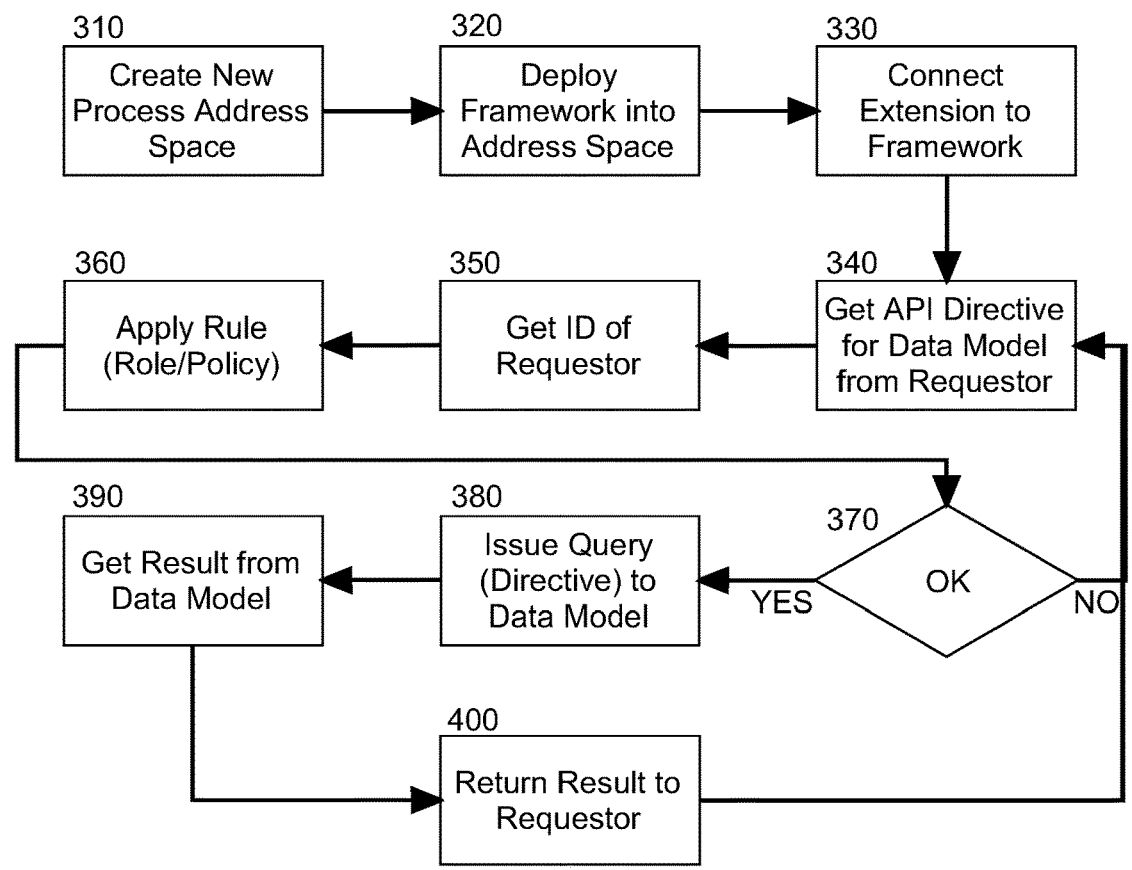

In yet further illustration of the operation of the extension framework 300, FIG. 3 is a flow chart illustration a process for extending access to a data model in a data analytics computer data processing system. Beginning in block 310, a new process address space is created in supplement to a process address space of the data analytics application, for instance a new virtual machine in a virtualization environment, or a new container in a containerized environment. In block 320, an instance of the extension framework is then deployed into the newly created address space and in block 330, a communicative connection is established between the extension framework and an extension to the data analytics application.

In block 340, a request for an API directive to be applied to the data model of the data analytics application is received in the extension framework from the extension and in block 350, an identity of the requestor is determined. Then, in block 360 one or more API permissions are applied to the identity of the requestor to determine whether or not the API directive is permitted. In decision block 370, if it is determined that the requestor is authorized according to the API permissions, in block 380 the extension framework issues the API directive to the data model in the form of a query and in response, a result set is received in block 390. Finally, in block 400 the result set is forwarded to the extension for use by the extension in extending the functionality of the data analytics application.

The present disclosure may be embodied within a system, a method, a computer program product or any combination thereof. The computer program product may include a computer readable storage medium or media having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various examples of the present disclosure. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular examples only and is not intended to be limiting of the disclosure. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description; but is not intended to be exhaustive or limited to the disclosure in the form disclosed. Many modifications and variations will be apparent to those of ordinary skill in the art without departing from the scope and spirit of the disclosure. The example was chosen and described in order to best explain the principles of the disclosure and the practical application, and to enable others of ordinary skill in the art to understand the disclosure for various examples with various modifications as are suited to the particular use contemplated.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
   receiving, at an extension framework computer program, a directive to access a data model managed in a data analytics computer data processing system;
   obtaining a set of application programming interface (API) functions of an API corresponding to the received directive;
   determining, using a security policy, a subset of the set of API functions accessible by the extension framework computer program, the security policy based on a set of API permissions, the set of API permissions defined by an extension tool, the extension tool enabled to define a separate process address from a process address of the data analytics computer data processing system;
   receiving a selection of a particular API function of the subset of API functions corresponding to the received directive;
   invoking the particular API function; and
   in response to invoking the particular API function, receiving, at the extension framework computer program, a result derived from the data model.

2. The method of claim 1, wherein the operations further comprise loading an instance of the extension framework computer program into a programmatically isolated process address space of a computer.

3. The method of claim 1, wherein the security policy comprises one or more of:
   a time when the directive can be processed;
   a location from which the directive can be received; or
   a number of directives that can be processed by an end user within a period of time.

4. The method of claim 1, wherein the extension framework computer program is deployed in the separate process address defined by the extension tool.

5. The method of claim 1, wherein the set of API permissions are based on a role of an end user corresponding to the directive.

6. The method of claim 1, wherein the particular API function comprises an aggregation function.

7. The method of claim 1, wherein the extension framework computer program receives the directive from over a computer communications network from a remote client.

8. A system comprising:
   data processing hardware; and
   memory hardware in communication with the data processing hardware, the memory hardware storing instructions that when executed on the data processing hardware cause the data processing hardware to perform operations comprising:
receiving, at an extension framework computer program, a directive to access a data model managed in a data analytics computer data processing system;
obtaining a set of application programming interface (API) functions of an API corresponding to the received directive;
determining, using a security policy, a subset of the set of API functions accessible by the extension framework computer program, the security policy based on a set of API permissions, the set of API permissions defined by an extension tool, the extension tool enabled to define a separate process address from a process address of the data analytics computer data processing system;
receiving a selection of a particular API function of the subset of API functions corresponding to the received directive;
invoking the particular API function; and
in response to invoking the particular API function, receiving, at the extension framework computer program, a result derived from the data model.

9. The system of claim 8, wherein the operations further comprise loading an instance of the extension framework computer program into a programmatically isolated process address space of a computer.

10. The system of claim 8, wherein the security policy comprises one or more of:
a time when the directive can be processed;
a location from which the directive can be received; or
a number of directives that can be processed by an end user within a period of time.

11. The system of claim 8, wherein the extension framework computer program is deployed in the separate process address defined by the extension tool.

12. The system of claim 8, wherein the set of API permissions are based on a role of an end user corresponding to the directive.

13. The system of claim 8, wherein the particular API function comprises an aggregation function.

14. The system of claim 8, wherein the extension framework computer program receives the directive from over a computer communications network from a remote client.

* * * * *